(12) United States Patent
Maeda et al.

(10) Patent No.: US 10,487,002 B2
(45) Date of Patent: Nov. 26, 2019

(54) GLASS HAVING EXCEPTIONAL CRACK RESISTANCE

(71) Applicant: AGC Inc., Chiyoda-ku (JP)

(72) Inventors: Kei Maeda, Tokyo (JP); Atsuo Yasumori, Tokyo (JP)

(73) Assignee: AGC Inc., Chiyoda-ku (JP)

(*) Notice: Subject to any disclaimer, the term of this patent is extended or adjusted under 35 U.S.C. 154(b) by 0 days.

(21) Appl. No.: 16/111,424

(22) Filed: Aug. 24, 2018

(65) Prior Publication Data
US 2018/0362391 A1 Dec. 20, 2018

Related U.S. Application Data

(63) Continuation of application No. PCT/JP2017/006690, filed on Feb. 22, 2017.

(30) Foreign Application Priority Data

Feb. 25, 2016 (JP) ................... 2016-034459
Jul. 19, 2016 (JP) ................... 2016-141309
Dec. 2, 2016 (JP) ................... 2016-235168

(51) Int. Cl.
| | | |
|---|---|---|
| C03C 10/06 | (2006.01) | |
| C03C 3/087 | (2006.01) | |
| C03B 32/02 | (2006.01) | |
| C03C 3/097 | (2006.01) | |

(52) U.S. Cl.
CPC .............. *C03C 3/087* (2013.01); *C03B 32/02* (2013.01); *C03C 3/097* (2013.01); *C03C 2203/10* (2013.01); *C03C 2203/52* (2013.01)

(58) Field of Classification Search
CPC .................................................. C03C 10/0036
See application file for complete search history.

(56) References Cited

U.S. PATENT DOCUMENTS

| | | | |
|---|---|---|---|
| 3,531,303 A | | 9/1970 | Bahat |
| 4,187,115 A | | 2/1980 | Reade |
| 4,794,094 A | * | 12/1988 | Makishima ......... C03C 10/0036 501/10 |
| 2009/0142568 A1 | | 6/2009 | Dejneka et al. |
| 2012/0308803 A1 | | 12/2012 | Dejneka et al. |
| 2015/0203396 A1 | | 7/2015 | Dejneka et al. |

(Continued)

FOREIGN PATENT DOCUMENTS

| | | |
|---|---|---|
| JP | 2010-520138 | 6/2010 |
| JP | 2011-505323 | 2/2011 |
| WO | WO 2008/104825 A1 | 9/2008 |

OTHER PUBLICATIONS

International Search Report dated May 23, 2017 in PCT/JP2017/006690 filed on Feb. 22, 2017 (with English Translation).

(Continued)

*Primary Examiner* — Karl E Group

(74) *Attorney, Agent, or Firm* — Oblon, McClelland, Maier & Neustadt, L.L.P.

(57) ABSTRACT

The present invention pertains to glass containing, in terms of mass % on an oxide basis, 40-80% of $SiO_2$, 1-30% of $Al_2O_3$, and 1-40% of CaO, the glass having dmisteinbergite as the crystalline phase. Such glass makes it difficult for cracks to progress and has exceptional crack resistance.

12 Claims, 12 Drawing Sheets

(56) References Cited

U.S. PATENT DOCUMENTS

2018/0029923 A1   2/2018  Dejneka et al.
2019/0062218 A1*  2/2019  Comte .................... C04B 35/44

OTHER PUBLICATIONS

Toshiya Abe, et al., "Hexagonal $CaAl_2Si_2O_8$ in a high temperature solution; metastable crystallization and transformation to anorthite," Mineralogical Journal, vol. 17, No. 6, Apr. 1995, pp. 257-281.
Eozen Strukelj, et al., "Effect of Zirconium on the Structure and Congruent Crystallization of a Supercooled Calcium Aluminosilicate Melt," Journal of the American Ceramic Society, vol. 98, No. 6, 2015, pp. 1942-1950.

* cited by examiner

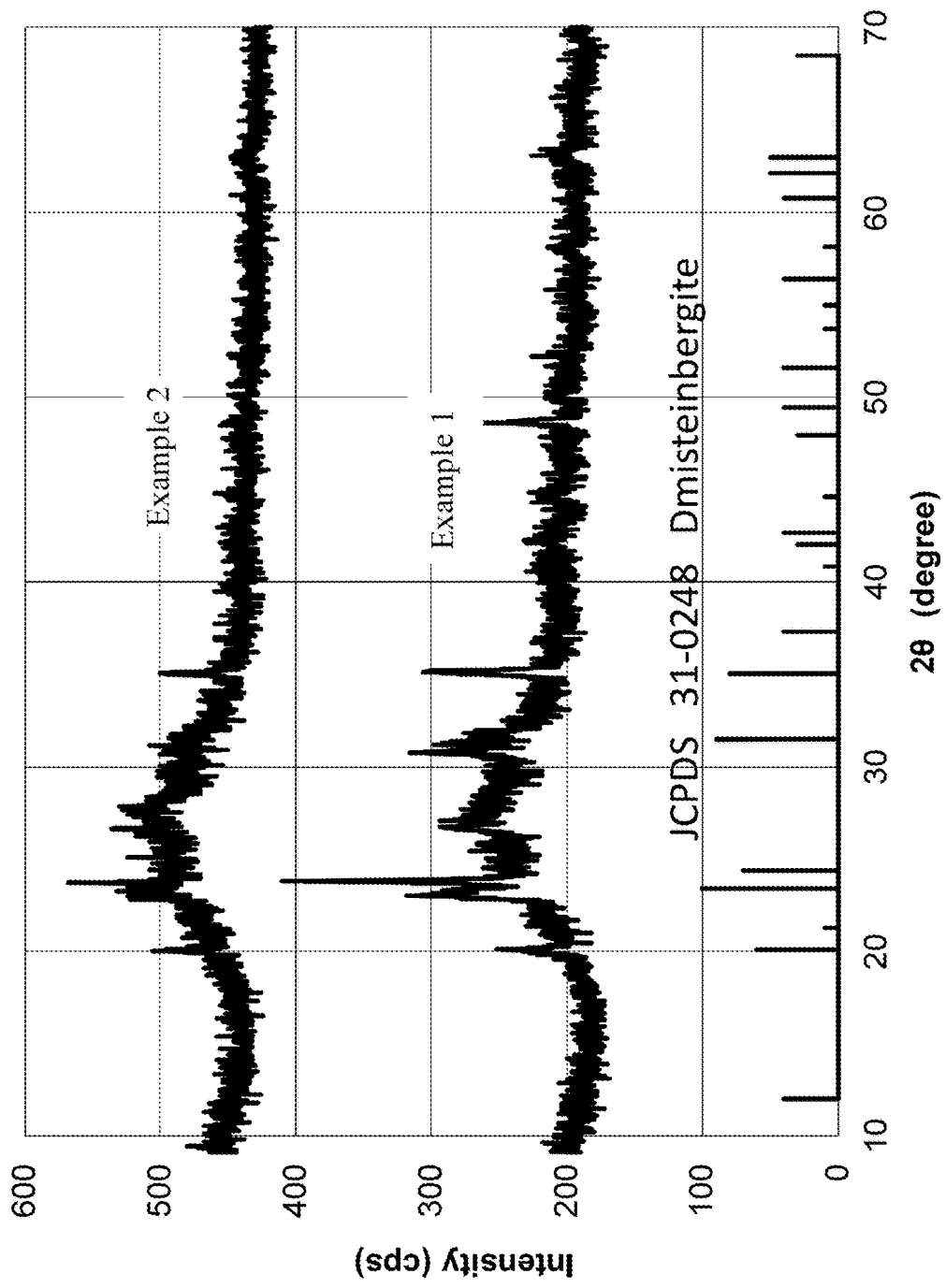

[FIG. 2]
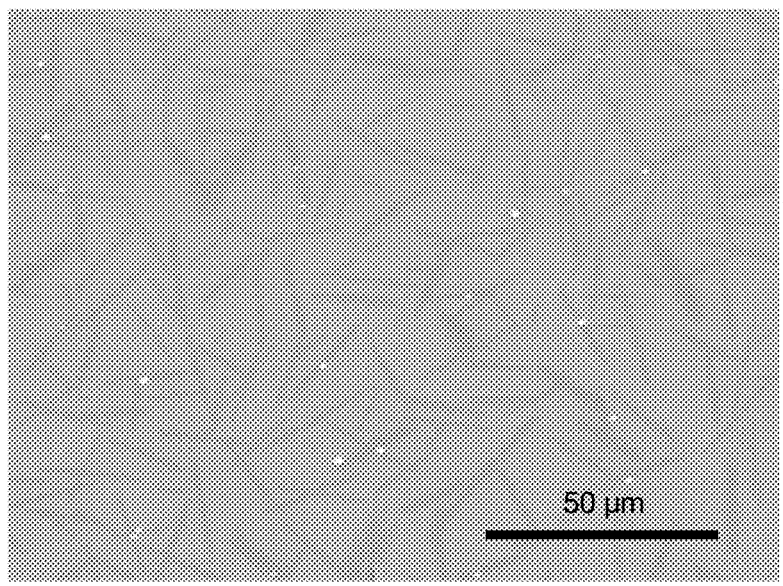
[FIG. 3]
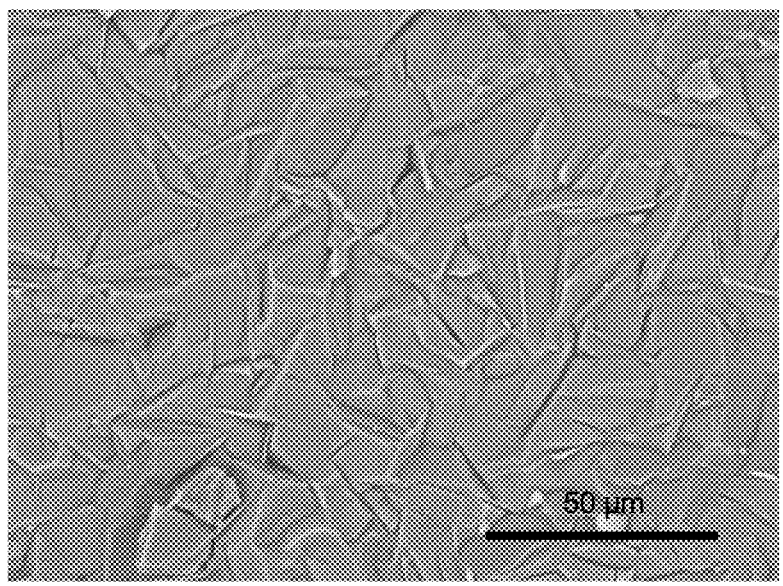

[FIG. 4]
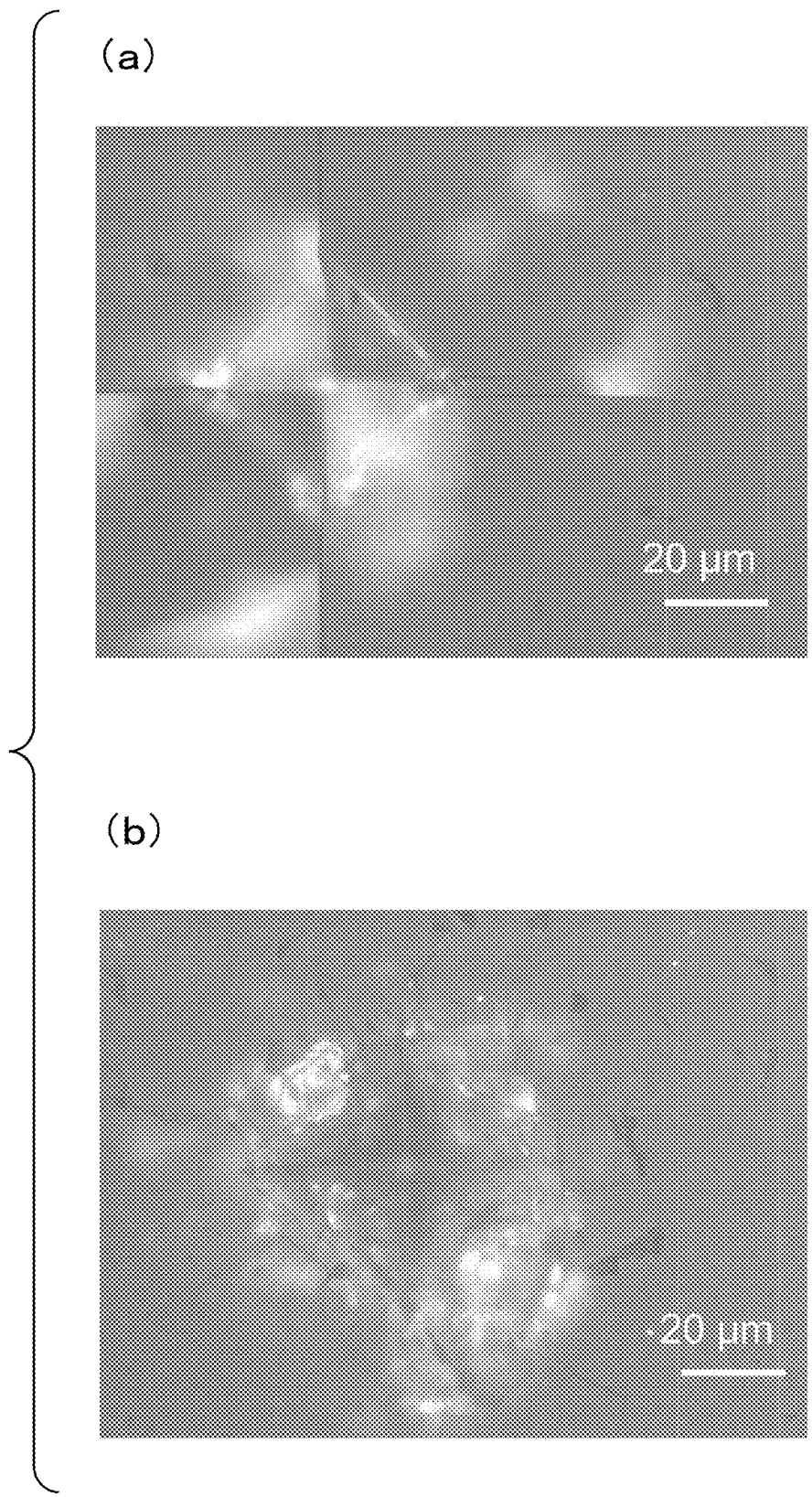

[FIG. 5]
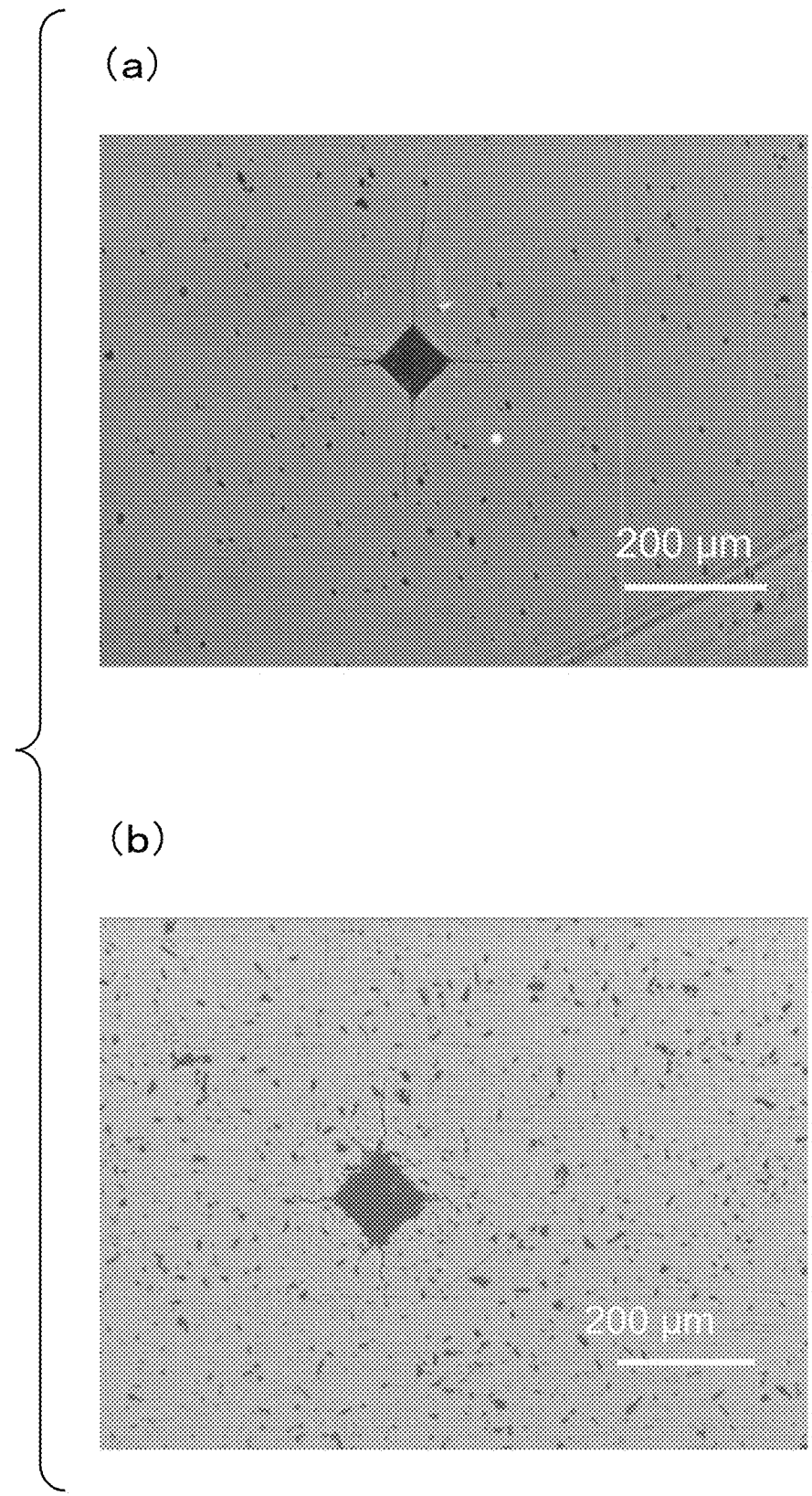

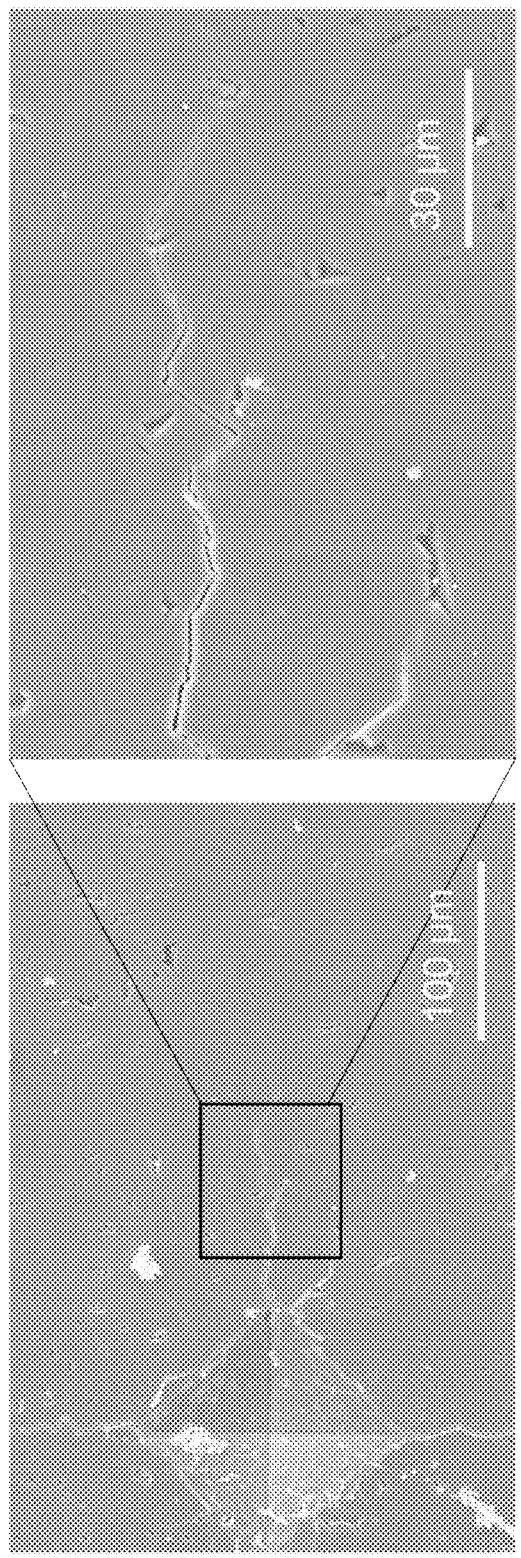
[FIG. 6]

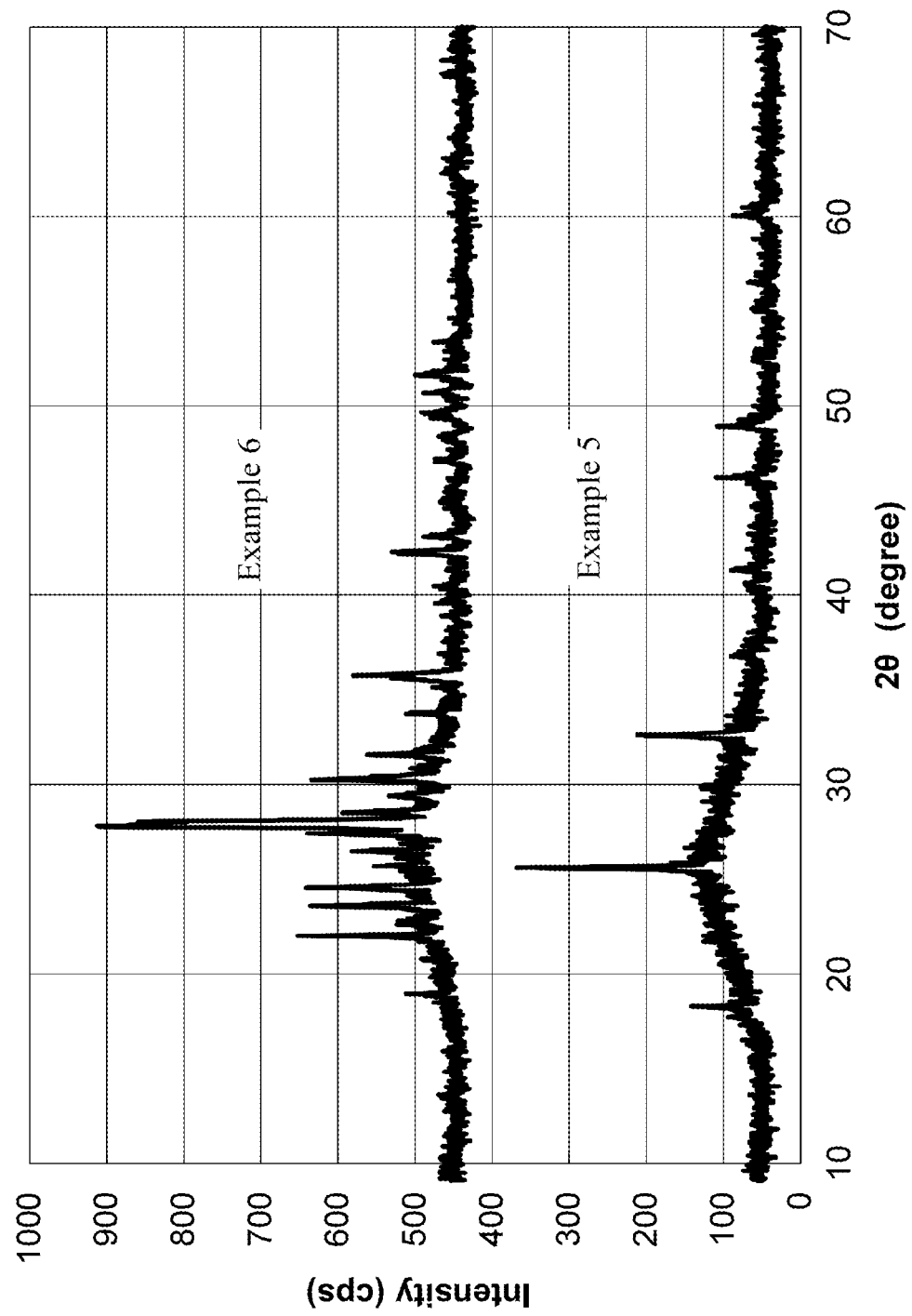

[FIG. 8]
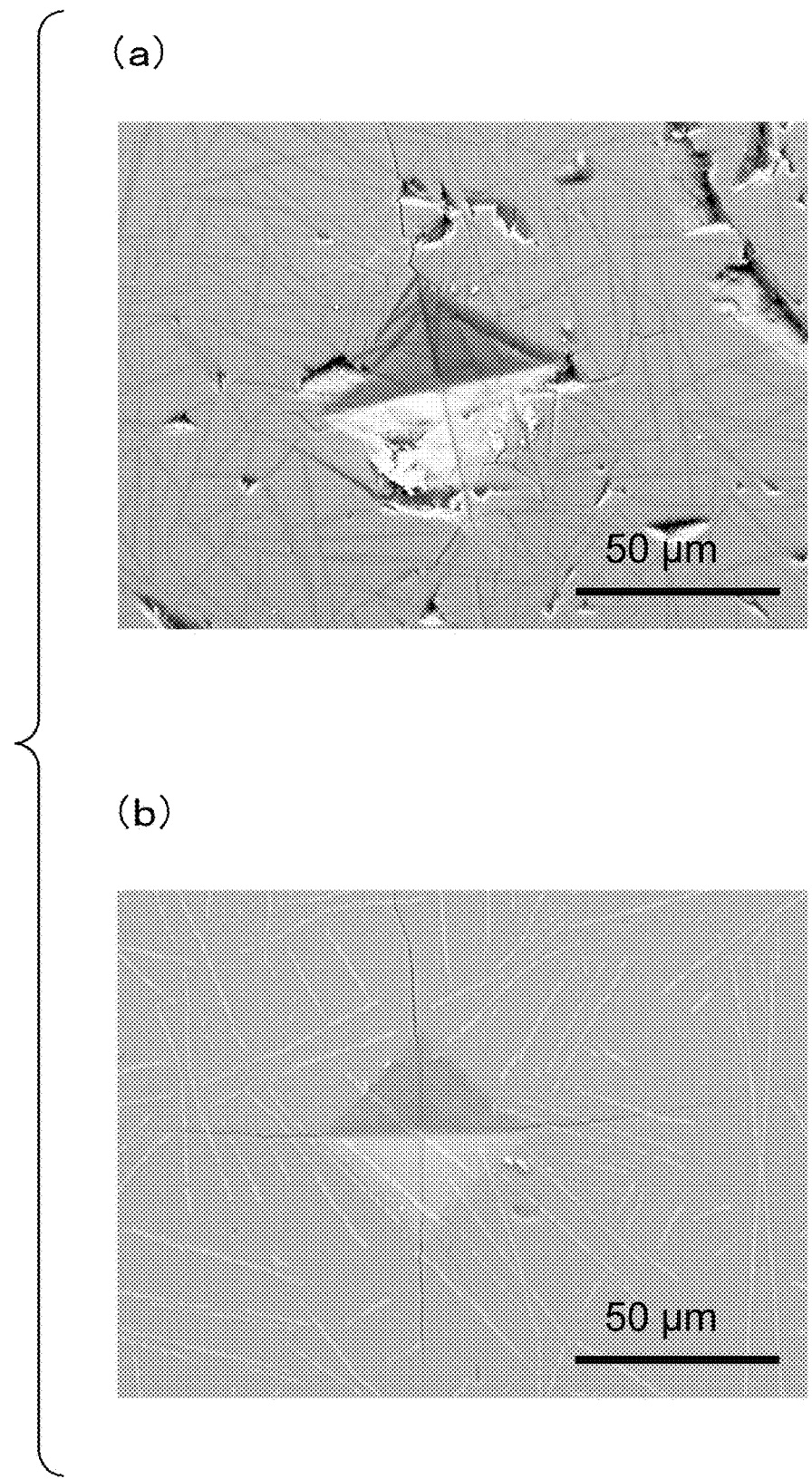

[FIG. 9]
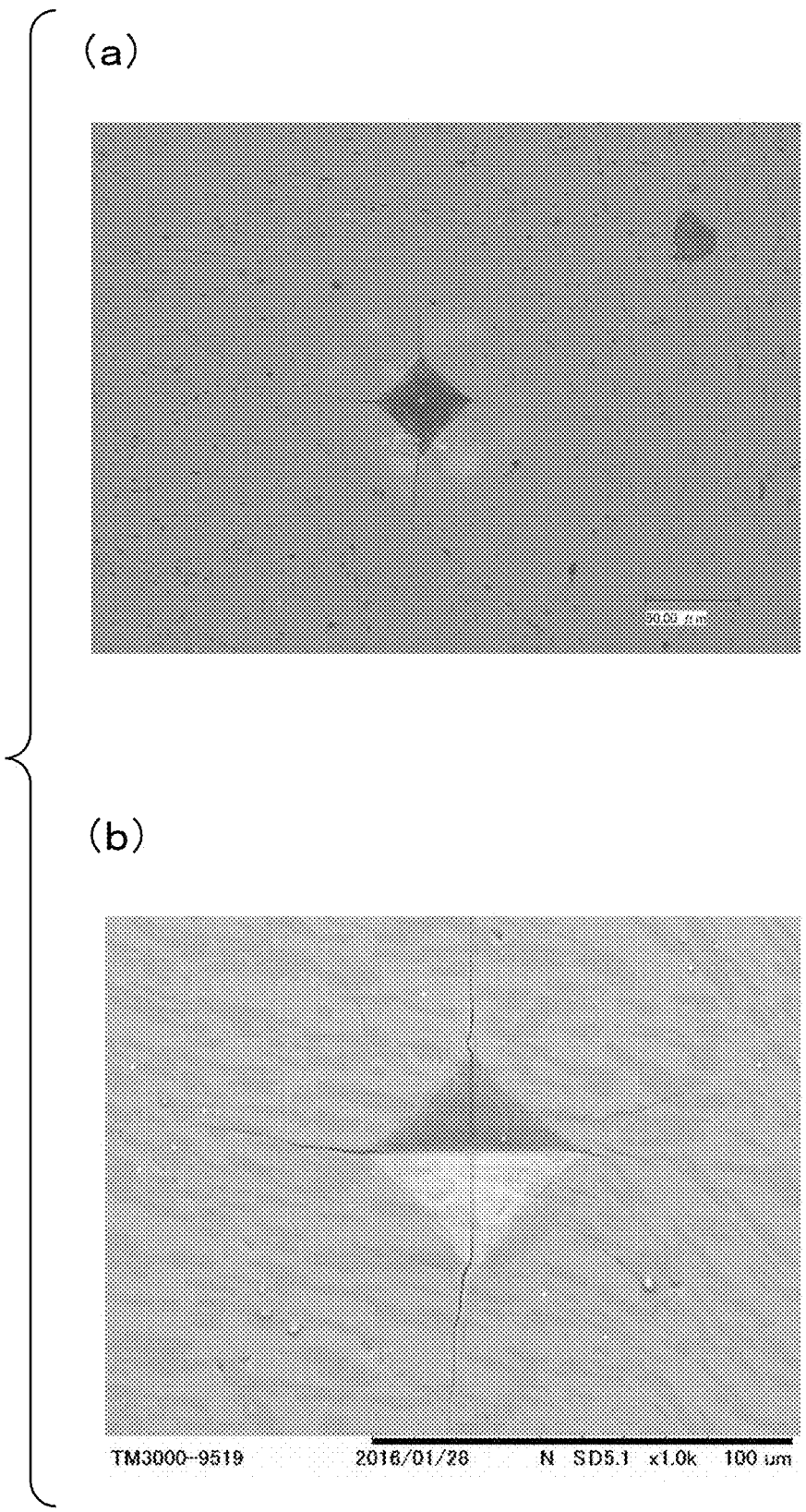

[FIG. 10]
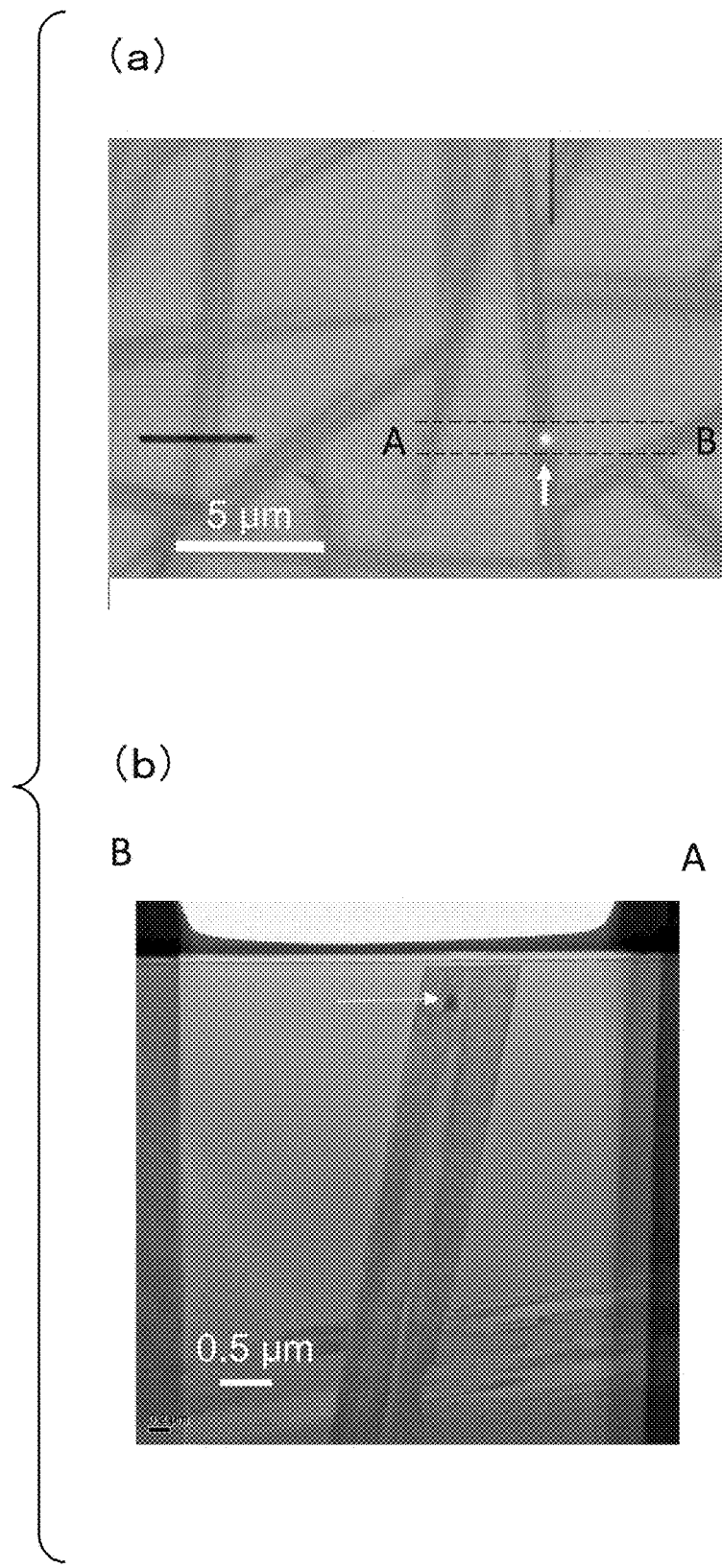

[FIG. 11]
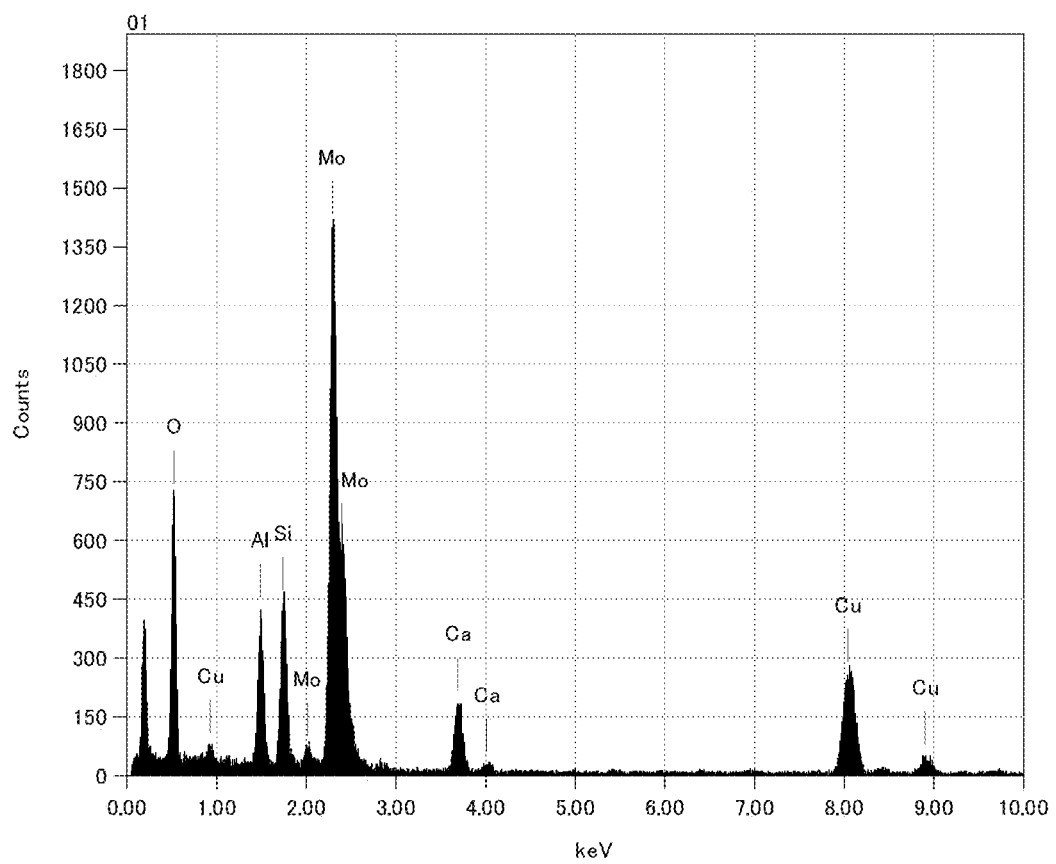

[FIG. 12]
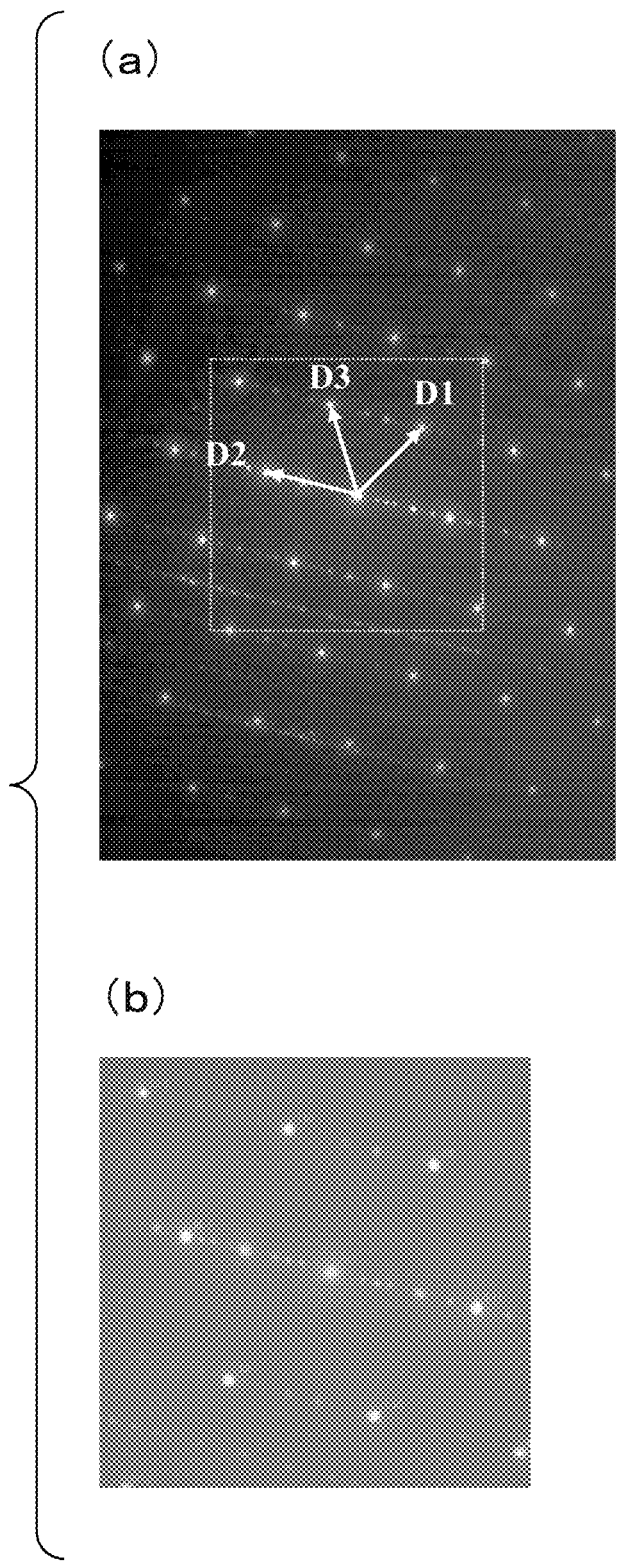

[FIG. 13]
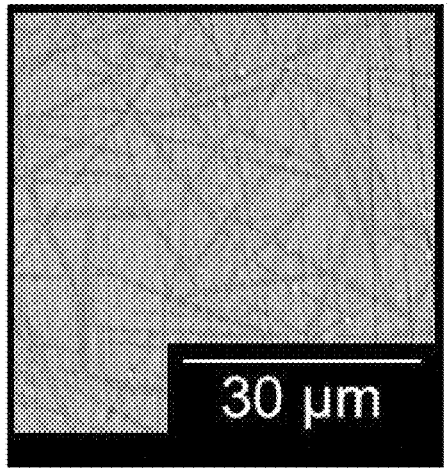
[FIG. 14]
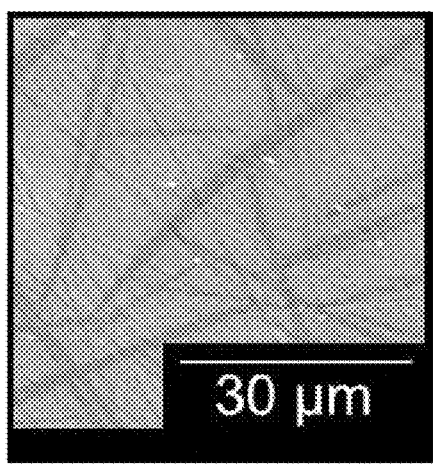
[FIG. 15]
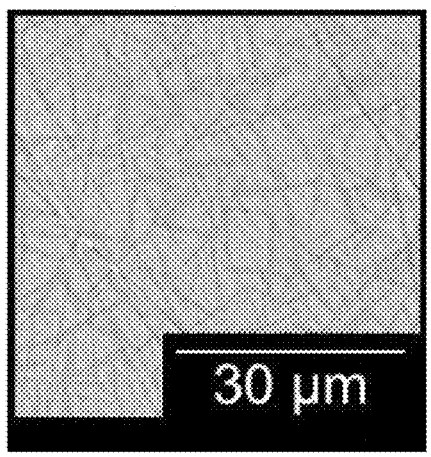

US 10,487,002 B2

GLASS HAVING EXCEPTIONAL CRACK RESISTANCE

TECHNICAL FIELD

The present invention relates to a glass having an excellent crack resistance in which cracks hardly propagate.

BACKGROUND ART

Glass is used in various fields such as window glasses, tableware, bottles, and covers of display devices, and one of the greatest problems of which is that it is easy to break by application of stress from the outside. For this reason, various approaches for improving strength of glass articles, such as chemical strengthening and surface coating, have been performed (refer to PTLs 1 and 2).

CITATION LIST

Patent Literature

PTL 1: JP-T-2011-505323
PTL 2: JP-T-2010-520138

SUMMARY OF INVENTION

Technical Problem

One of the essential reasons why glass articles are easy to break is because there is no grain boundary inhibiting propagation of cracks in glass and cracks once formed are easy to propagate. This essential problem cannot be solved even by applying a treatment such as chemical strengthening or coating to glass. In other words, cracks penetrating through a chemical strengthening layer or a coating layer easily propagate in glass and glass articles are broken.

In order to solve the above problems, the present invention has an object to provide a glass having an excellent crack resistance in which cracks hardly propagate.

Solution to Problem

The present inventors have found that the propagation of cracks generated in glass can be remarkably inhibited by precipitating crystals corresponding to a specific mineral inside the glass, and propose as the present invention.

Specifically, the present invention provides a glass:
containing, in terms of mass % on oxide basis,
$SiO_2$ 40 to 80%,
$Al_2O_3$ 1 to 30%, and
CaO 1 to 40%, and
containing dmisteinbergite as a crystalline phase.

In the glass of the present invention, the dmisteinbergite preferably has peaks at 2θ in at least the vicinity of 20°, the vicinity of from 23 to 25° and the vicinity of 35°, in a diffracted X-ray analysis using Cu-Kα beam as a radiation source.

The glass of the present invention preferably contains the dmisteinbergite of 2% or more in terms of volume fraction (SEM observation).

The glass of the present invention preferably further contains at least one of $MoO_3$, $Fe_2O_3$, $WO_3$, $V_2O_5$, $Cr_2O_3$, $Ta_2O_5$, and $TiO_2$.

It is preferred that the glass of the present invention contains $MoO_3$ in an amount of from 0.01 to 1% in terms of mass % on oxide basis. Furthermore, the glass of the present invention preferably contains $WO_3$ in an amount of from 0.01 to 1% in terms of mass % on oxide basis.

It is preferred that the glass of the present invention contains $TiO_2$ in an amount of from 0.11 to 0.5% in terms of mass % on oxide basis and contains $MoO_3$ in an amount of from 0.003 to 1% in terms of mass % on oxide basis.

The glass of the present invention preferably contains $TiO_2$ in an amount of from 0.1 to 0.5% in terms of mass % on oxide basis and contains $WO_3$ in an amount of from 0.01 to 1% in terms of mass % on oxide basis.

The present invention further provides a method for manufacturing the glass of the present invention, containing melting glass raw materials prepared so as to have the following composition in terms of mass % on oxide basis and to further contain from 0.2 to 5 mass % of C added thereto, annealing and then, heat-treating at a temperature of Tg+50° C. or higher and Tg+600° C. or lower (but lower than a liquidus temperature of a glass to be manufactured) in which Tg (° C.) represents a glass transition point of the glass to be manufactured:
$SiO_2$ 40 to 80%,
$Al_2O_3$ 1 to 30%, and
CaO 1 to 40%.

The present invention further provides a method for manufacturing the glass of the present invention, containing melting glass raw materials prepared so as to have the following composition in terms of mass % on oxide basis and to further contain from 0.001 to 5 mass % of Si added thereto, annealing and then, heat-treating at a temperature of Tg+50° C. or higher and Tg+600° C. or lower (but lower than a liquidus temperature of a glass to be manufactured) in which Tg (° C.) represents a glass transition point of the glass to be manufactured:
$SiO_2$ 40 to 80%,
$Al_2O_3$ 1 to 30%, and
CaO 1 to 40%.

In the manufacturing method, it is preferred to melt the glass raw materials containing from 0.001 to 0.2 mass % of Si added thereto.

The glass of the present invention may be obtained by melting glass raw materials prepared so as to have the following composition in terms of mass % on oxide basis and to further contain from 0.001 to 0.2 mass % of Si added thereto, annealing and then, heat-treating at a temperature of Tg+50° C. or higher and Tg+600° C. or lower (but lower than a liquidus temperature of a glass to be manufactured) in which Tg (° C.) represents a glass transition point of the glass to be manufactured:
$SiO_2$ 40 to 80%,
$Al_2O_3$ 1 to 30%, and
CaO 1 to 40%.

Advantageous Effects of Invention

According to the present invention, a glass having an excellent crack resistance in which cracks hardly propagate can be obtained without deteriorating texture inherent in glass.

Even in the case where cracks have been generated in the glass of the present invention, cracks are difficult to propagate and therefore, the possibility of generation of chipping is low. For this reason, it is expected to be applied to various fields such as window glasses, tableware, bottles, and covers of display devices. In other words, the glass of the present invention is an unprecedented glass having strength, being difficult to be broken, being difficult to be chipped, being safe, and securing the beauty.

BRIEF DESCRIPTION OF DRAWINGS

FIG. 1 is a graph showing XRD patterns of crystals precipitated inside the glasses of Examples 1 and 2 and further shows peak data (31-0248) of dmisteinbergite ($CaAl_2Si_2O_8$) in JCPDS card chart.

FIG. 2 is a SEM photograph of the inside of the glass of Example 1.

FIG. 3 is a SEM photograph of a fracture surface of the glass of Example 1.

FIG. 4 includes optical photomicrographs of the glass surface after indenting Vickers indenter under a load of 1 kg; (a) of FIG. 4 is the glass of Example 0; and (b) of FIG. 4 is the glass of Example 1.

FIG. 5 includes optical photomicrographs of the glass surface after indenting Vickers indenter under a load of 5 kg; (a) of FIG. 5 is the glass of Example 0; and (b) of FIG. 5(b) is the glass of Example 1.

FIG. 6 includes a SEM photograph of the glass surface of (b) of FIG. 5 and its enlarged view.

FIG. 7 is a graph showing XRD patterns of crystals precipitated inside the glasses of Examples 5 and 6.

FIG. 8 includes SEM photographs of the glass surface after indenting Vickers indenter under a load of 1 kg; (a) of FIG. 8 is the glass of Example 4; and (b) of FIG. 8 is the glass of Example 5.

(a) of FIG. 9 is an optical photomicrograph of the glass surface of Example 6 after indenting Vickers indenter under a load of 1 kg; and (b) of FIG. 9 is a SEM photograph of the surface.

(a) of FIG. 10 is a SEM image of Example 7 to slice for TEM observation; and (b) of FIG. 10 is a TEM observation image of this cross-sectional sliced sample.

FIG. 11 is EDX spectrum of precipitated fine particles of the glass of Example 7.

(a) of FIG. 12 is an electron beam diffraction pattern of precipitated fine particles of the glass of Example 7; and (b) of FIG. 12 shows a diffraction image, which appears when irradiating metal molybdenum with electron beams, generated by calculation.

FIG. 13 is a SEM photograph of the glass of Example 21, having crystals precipitated therein.

FIG. 14 is a SEM photograph of the glass of Example 22, having crystals precipitated therein.

FIG. 15 is a SEM photograph of the glass of Example 23, having crystals precipitated therein.

DESCRIPTION OF EMBODIMENTS

The glass of the present invention and the method for manufacturing the same are described below.

The glass of the present invention is a glass:
containing, in terms of mass % on oxide basis,
$SiO_2$ 40 to 80%,
$Al_2O_3$ 1 to 30% and
CaO 1 to 40%, and
containing dmisteinbergite as a crystalline phase.

In the present description, mass % is hereinafter simply written as %.

Dmisteinbergite is a polymorphism of plagioclase having a chemical composition of $CaAl_2Si_2O_8$ or the like and is known as a metastable phase.

The dmisteinbergite itself is described as a hexagonal mineral in JCPDS card No. 31-0248, but after that, researches were conducted on its crystal structure (Documents 1 and 2). It has been known that the chemical composition deviates from the stoichiometric composition, like $Ca_{1-x}(Al, Si)_{2+x}O_8$ rather than $CaAl_2Si_2O_8$, and it has been also known that BaO, SrO, rare earth oxides and the like are contained (Document 2). Monoclinic $CaAl_2Si_2O_8$ crystal closely resembling to a diffraction pattern (JCPDS card No. 31-0248) of dmisteinbergite (in particular, closely resembling in a range of from 10° to 35° of 2θ in diffraction X-ray analysis using Cu-Kα beam as a radiation source) is also registered in No: 00-062-0853 in the data base, The International Centre for Diffraction Data (ICDD), published in 2012. Accordingly, various interpretations can be made on mineralogy, but the dmisteinbergite in the present invention means a crystalline phase having peaks at 2θ in at least the vicinity of 20°, the vicinity of from 23 to 25° and the vicinity of 35° (having peaks in at least the vicinity of 4.4 angstroms, the vicinity of from 3.7 to 3.8 angstroms and the vicinity of 2.6 angstroms in terms of d value) in diffraction X-ray analysis using Cu-Kα beam as a radiation source. The term "vicinity" in the present invention is, for example, preferably within a range of ±10% (when 20°, 20°±2°; and when 4.4 angstroms, 4.4 angstroms ±0.44 angstroms), more preferably within a range of ±5%, and still more preferably within a range of ±3%.

Document 1: Physics and Chemistry of Minerals, vol. 17, 473-484 (1991)

Document 2: American Mineralogist, vol. 101, 71-81 (2016)

The glass of the present invention is a glass in which dmisteinbergite in the present invention has been precipitated in a needle-shape or plate-shape state in glass and is a glass having the dmisteinbergite in the present invention.

FIG. 1 is a graph showing XRD patterns of crystals precipitated inside the glasses of Examples 1 and 2 in Examples described hereinafter; and further shows peak data (31-0248) of dmisteinbergite ($CaAl_2Si_2O_8$) in JCPDS card chart. As shown in FIG. 1, the glasses of Examples 1 and 2 are that XRD patterns of crystals precipitated inside the glass show the same tendency as peak data (31-0248) of dmisteinbergite ($CaAl_2Si_2O_8$) in JCPDS card chart, and have peaks at 2θ in at least the vicinity of 20°, the vicinity of from 23 to 25° and the vicinity of 35° (having peaks in at least the vicinity of 4.4 angstroms, the vicinity of from 3.7 to 3.8 angstroms and the vicinity of 2.6 angstroms, in terms of d value). In the present invention, these cases are regarded as a glass having dmisteinbergite of the present invention precipitated therein and called a glass having dmisteinbergite of the present invention.

As demonstrated in Examples described hereinafter, even in the case where cracks are generated, the glass of the present invention in which dmisteinbergite has been precipitated as a crystalline phase remarkably suppresses the propagation of cracks. The reason for this is assumed such that due to the difference in thermal expansion behavior between matrix glass and dmisteinbergite precipitated in a needle-shape or plate-shape state inside the glass, large strain is generated at the interface of those, the interface is easy to peel and the propagation of cracks is inhibited. Anorthite ($CaAl_2Si_2O_8$) is known as a crystalline phase having the same chemical composition as dmisteinbergite, but it has been confirmed in the Examples described hereinafter that the propagation of cracks cannot be suppressed in a glass having anorthite precipitated therein as a crystalline phase. This is assumed such that while dmisteinbergite inhibits the propagation of cracks for the reasons described before, large strain is not generated at the interface between anorthite and matrix glass, and as a result, the propagation of cracks cannot be inhibited.

In the present invention, dmisteinbergite precipitated inside the glass is observed with SEM and the amount of dmisteinbergite precipitated is evaluated by its volume fraction. The amount of dmisteinbergite precipitated in the glass of the present invention is preferably 2% or more in terms of volume fraction (SEM observation), that is, in terms of volume fraction in SEM observation, in exhibiting the effect of suppressing the propagation of cracks, and it is more preferably 5% or more and still more preferably 10% or more.

To precipitate dmisteinbergite as a crystalline phase, it is essential for the glass of the present invention to contain $SiO_2$, $Al_2O_3$ and $CaO$.

In the glass of the present invention, $SiO_2$ is a network-forming oxide of glass and a component for precipitating dmisteinbergite, and is therefore essential. The glass of the present invention contains $SiO_2$ in an amount of from 40 to 80%. To obtain a stable glass, the $SiO_2$ content is 40% or more and preferably 50% or more. The $SiO_2$ content is 80% or less, preferably 75% or less, more preferably 70% or less, and still more preferably 65% or less, from the standpoint of easy manufacturing of the glass.

In the glass of the present invention, $Al_2O_3$ is a component for precipitating dmisteinbergite, facilitates glass formation and is therefore essential. The glass of the present invention contains $Al_2O_3$ in an amount of from 1 to 30%. To precipitate dmisteinbergite, the $Al_2O_3$ content is 1% or more, preferably 5% or more and more preferably 10% or more. To avoid excessively high melting temperature of the glass, the $Al_2O_3$ content is 30% or less and preferably 25% or less.

In the glass of the present invention, $CaO$ is a component for precipitating dmisteinbergite, accelerates glass melting and is therefore essential. To precipitate dmisteinbergite, the $CaO$ content is 1% or more, preferably 2% or more, 3% or more or 5% or more, and still further preferably 10% or more. To suppress the rising of devitrification temperature of the glass, the $CaO$ content is 40% or less, preferably 35% or less and more preferably 30% or less.

Although the details are described hereinafter, in manufacturing the glass of the present invention, carbon (C) is added to the glass raw material as a reducing agent for precipitating dmisteinbergite and further as a nucleating agent to be considered as a possibility. In such a case, a component acting as a nucleating aid is preferably added to the glass raw material. Specifically, the component is at least one of $MoO_3$, $Fe_2O_3$, $WO_3$, $V_2O_5$, $Cr_2O_3$, $Nb_2O_5$, $Ta_2O_5$, and $TiO_2$, and preferably at least one of $MoO_3$, $Fe_2O_3$, $WO_3$, $V_2O_5$, $Cr_2O_3$, $Ta_2O_5$, and $TiO_2$, and a glass manufactured by adding those components is a glass containing those components. The contents of those components vary depending on the amount added to the glass raw material. In the case of adding $MoO_3$ to the glass raw material as in the glasses used in Examples, $MoO_3$ is contained in an amount of preferably 0.003% or more, more preferably 0.005% or more and still more preferably from 0.01 to 1%, in terms of mass % on oxide basis. Furthermore, in the case of adding $WO_3$ to the glass raw material, $WO_3$ is contained in an amount of preferably 0.003% or more, more preferably 0.005% or more and still more preferably from 0.01 to 1%, in terms of mass % on oxide basis.

Furthermore, it is preferable that $MoO_3$ is contained in an amount of 0.003% or more and 1% or less or 0.5% or less, and $TiO_2$ is contained in an amount of 0.11% or more and 0.5% or less. It is more preferable that $MoO_3$ is contained in an amount of 0.003% or more and 0.1% or less, 0.05% or less or 0.01% or less, and $TiO_2$ is contained in an amount of 0.13% or more or 0.15% or more and 0.5% or less.

Furthermore, it is preferable that $WO_3$ is contained in an amount of 0.01% or more and 1% or less and $TiO_2$ is contained in an amount of 0.1% or more and 0.5% or less. It is more preferable that $WO_3$ is contained in an amount of 0.015% or more and 0.5% or less, and $TiO_2$ is contained in an amount of 0.2% or more and 0.5% or less.

The glass of the present invention can contain components (other components) other than the above in a range that does not impair the object of the present invention. Examples of the other components include an alkali metal oxide such as $Li_2O$, $Na_2O$ and $K_2O$; an alkaline earth metal oxide such as $MgO$, $SrO$ and $BaO$; $B_2O_3$, $P_2O_5$, and $ZrO_2$.

In the case where the glass of the present invention contains the other component, the content thereof is preferably 40% or less, more preferably 38% or less, still more preferably 20% or less, and still further preferably 10% or less, in terms of the total content including the components acting as the above-described nucleating agent.

When manufacturing the above-described glass of the present invention, glass raw materials are prepared so as to have the following composition in terms of mass % on oxide basis. The reason that the glass raw materials are made to have the following composition is as described above.

| | |
|---|---|
| $SiO_2$ | 40 to 80% |
| $Al_2O_3$ | 1 to 30% |
| $CaO$ | 1 to 40% |

However, other than single oxides such as silicon oxide ($SiO_2$), aluminum oxide ($Al_2O_3$) and calcium oxide ($CaO$), carbonates, hydroxides, composite oxides and the like of these metal elements can be appropriately used in a glass raw material so long as the above-described composition is satisfied.

Carbon (C) in an amount of from 0.2 to 5 mass % is added to the glass raw material as a reducing agent for precipitating dmisteinbergite and further as a nucleating agent to be considered as a possibility. To precipitate dmisteinbergite, the amount of carbon (C) added is 0.2% or more, preferably 0.3% or more and more preferably 0.4% or more. However, in the case where the amount of carbon (C) added exceeds 5%, $SiO_2$ and $Al_2O_3$ as glass components are reduced and glass is difficult to be formed, which is not preferred. Carbon (C) may be added as a single substance and may be added as carbide. Furthermore, a carbon-containing compound such as sucrose; ammonium salt; metallic Si; and the like may be added as a reducing agent. Si can act as a nucleating agent, other than as a reducing agent. In the case where Si is added to the raw material, it can be added in an amount of from 0.001 to 5 mass % and preferably from 0.001 to 1 mass %. However, in order that Si can act as a nucleating agent, it is added in an amount of preferably 0.2 mass % or less, more preferably 0.1 mass % or less, more preferably 0.05 mass % or less, and more preferably 0.03 mass % or less, and is added in an amount of preferably 0.003 mass % or more, more preferably 0.005 mass % or more and more preferably 0.007 mass % or more.

As necessary, the above-described other components may be added to the glass raw material in a range that does not impair the object of the present invention.

The glass of the present invention having dmisteinbergite precipitated therein can be obtained by melting the glass raw materials prepared so as to have the above-described composition and to further contain a predetermined amount of carbon (C) added thereto, and after annealing, heat-treating at a temperature of Tg+50° C. or higher and Tg+600° C. or lower (this temperature is called a heat treatment temperature in the present invention; however, the temperature is lower than a liquidus temperature of a glass to be manufactured) when a glass transition point of the glass to be manufactured is denoted by Tg (° C.) (specifically, heating to the heat treatment temperature and maintaining preferably from 0 to 10 hours; maintaining more preferably 5 minutes or more, still more preferably 30 minutes or more, further more preferably 1 hour or more, and still further more preferably 2 hours or more, and preferably 7 hours or less, more preferably 5 hours or less, and still more preferably 3 hours or less).

As a method for melting the glass raw materials having carbon (C) added thereto, a method of placing the prepared and mixed glass raw materials in a crucible and heating the crucible in an electric furnace is preferably used. The glass raw material was melted in a reducing atmosphere having an oxygen concentration of 1 vol % or less in Examples described hereinafter, but it is not limited to this and the glass raw material may be melted in the ambient atmosphere.

The heat treatment may be carried out in any of a reducing atmosphere and the ambient atmosphere.

EXAMPLE

The present invention is described in further detail below by reference to Examples, but the present invention is not construed as being limited thereto.

Silica powder, aluminum oxide, calcium carbonate, molybdenum oxide and carbon powder in an amount of mass % shown in Table 1 were weighed and mixed such that 300 g of each of glasses (excluding C) having compositions of Examples 1 and 2 shown by mass % in the column of glass composition in Table 1 was obtained. The mixed glass raw materials were placed in 300 cc platinum crucible in two parts, heated in an electric furnace maintained at 1,550° C. and melted. A frame of a city gas burner was introduced into the electric furnace and an oxygen concentration in the furnace was set to 1% or less. For homogenization during melting, the resulting melt was stirred for 1 hour by using a platinum stirrer. The stirred glass was allowed to stand in the furnace for 30 minutes and then poured out of the crucible, thereby obtaining a glass slab. The glass slab was placed in an electric furnace maintained at 850° C., maintained therein for 30 minutes and then annealed to room temperature at a rate of 60° C. per hour. A part of the annealed glass was cut, and the glass was heated to 1,050° C. at a rate of 100° C. per hour. After heat-treating the glass by maintaining at the temperature for 2 hours, the glass was cooled to 750° C. at a rate of 600° C. per hour and then naturally cooled in the furnace. The glasses of Examples 1 and 2 have a glass transition point Tg of 821° C.

The surface of the glass thus heat-treated was polished in a depth of 200 μm or more to remove a surface crystal layer. A part of the glass was ground in an aluminum mortar to pulverize, and a crystalline phase precipitated was identified by a powder X-ray diffraction by using Lab-X XRD-6100 (X-ray tube: Cu-Kα) manufactured by Shimadzu Corporation. FIG. 1 is a graph showing XRD patterns of crystals precipitated inside the glasses of Examples 1 and 2, which shows the same tendency as peak data (31-0248) of dmisteinbergite ($CaAl_2Si_2O_8$) in JCPDS card chart, and has peaks at 2θ in at least the vicinity of 20°, the vicinity of from 23 to 25° and the vicinity of 35°. From this fact, it was confirmed that the glasses contain dmisteinbergite of the present invention. However, because inherent halo pattern (smooth curve tendency) clearly remains in the glass, it was confirmed that a major part remains as glass.

The glass sample of Example 1 having been subjected to the heat treatment in the same procedures as above was mirror polished to a thickness of 2.5 mm, and crystals precipitated inside were observed by using a scanning electron microscope (SEM) (TM-3000 manufactured by Hitachi, Ltd.). FIG. 2 shows its photograph, and it was confirmed that crystals of dmisteinbergite looked like a needle-shape having a length of several tens of μm are precipitated. However, from that a part of the crystals looks like a flat plate shape having a width, it is considered that the cross-section of a flat plate-shaped crystal looks like a needle-shape. The fracture surface of the glass heat-treated was observed with SEM. FIG. 3 is its photograph, and it was confirmed that asperity is formed on the fracture surface.

It was confirmed from the SEM photograph of FIG. 2 that the amount of dmisteinbergite precipitated is 2% or more in terms of volume fraction.

Next, Vickers diamond indenter was indented to the inside of the glass having crystals precipitated therein under loads of 1 kg and 5 kg. For the sake of comparison, to a glass sample (Example 0) prepared in the same procedures as in Example 1 without a heat treatment after annealing, the diamond indenter was indented under the same conditions. FIG. 4 includes optical photomicrographs of the glass surface after indenting Vickers indenter under a load of 1 kg. (a) of FIG. 4 is the glass of Example 0 and (b) of FIG. 4 is the glass of Example 1. FIG. 5 includes optical photomicrographs of the glass surface after indenting Vickers indenter under a load of 5 kg. (a) of FIG. 5 is the glass of Example 0 and (b) of FIG. 5 is the glass of Example 1. In the glass (Example 0) without heat treatment, cracks are generated from four corners of the impression under any of loads, whereas in the glass (Example 1) having been subjected to the heat treatment and having dmisteinbergite precipitated herein, the propagation of cracks was not observed under a load of 1 kg. Furthermore, under a load of 5 kg, the propagation of cracks in the glass (Example 1) having been subjected to the heat treatment was far short as compared with the glass (Example 0) without the heat treatment. FIG. 6 includes a SEM photograph of the glass surface of (b) of FIG. 5 and its enlarged view. As shown in FIG. 6, when cracks generated in the glass (Example 1) having been subjected to the heat treatment is carefully observed with SEM, it was confirmed that cracks do not go straight and greatly turn along the interface of the needle-shape crystals. In other words, it was revealed that dmisteinbergite precipitated inside the glass prevents rectilinear propagation of cracks. By this, even in the case where cracks are generated, the propagation of cracks is suppressed. It was further revealed that when a glass is broken, concavo-convex fracture surface as seen in FIG. 2 is formed and the glass is difficult to be broken. Crystals of dmisteinbergite are precipitated over inside the glass. Therefore, it is considered that this effect is not limited to only the surface of the glass, but toughens the whole glass.

A glass sample (excluding C) having the composition of Example 3 shown by mass % in the column of glass composition in Table 1 was prepared in the same procedures as above. This glass has a glass transition point Tg of 821° C.

Crystalline phase precipitated inside the glass was identified by XRD and observed with SEM, and Vickers diamond indenter was indented under a load of 1 kg, in the same procedures as above. It could not be confirmed from XRD pattern that dmisteinbergite is precipitated inside the glass. When Vickers indenter was indented under a load of 1 kg, cracks were generated from four corners of the impression.

Subsequently, raw materials were prepared such that 50 g each of glasses (excluding C) of Examples 4 and 5 shown by mass % in the column of glass composition in Table 1 were obtained, and melted at 1,550° C. for 1 hour in the air by using an alumina crucible. The glasses obtained were annealed in the same manner as above to obtain glass slabs. A part of each glass was cut and heated up to 1,050° C. from room temperature at a rate of 100° C. per hour. Thereafter, those cut pieces were heat-treated by maintaining at the temperature for 2 hours, cooled to 750° C. at a rate of 100° C. per hour and then naturally cooled in the furnace to obtain glass samples. The glasses of Examples 4 and 5 have a glass transition point Tg of 821° C. and 725° C., respectively.

Crystalline phase precipitated inside the glass was identified by XRD in the same procedures as above, and it was confirmed that dmisteinbergite was precipitated inside the glass of Example 4. It was further confirmed that needle-shape crystals of magnesium-titanate ($2MgO \cdot TiO_2$) were precipitated in the glass of Example 5. XRD pattern of crystals precipitated inside the glass of Example 5 is shown in FIG. 7.

Those samples were mirror polished to a thickness of 2.5 mm, and after indenting Vickers diamond indenter under a load of 1 kg, the circumferential state of the impression was observed with SEM. Those photographs are shown in FIG. 8. (a) of FIG. 8 is the glass of Example 4 and (b) of FIG. 8 is the glass of Example 5. The glass shown in Example 4 is that because dmisteinbergite was precipitated by the heat treatment, the propagation of cracks was prevented. On the other hand, in the case of Example 5 in which needle-shape crystals of magnesium-titanate were precipitated, cracks propagated on the needle-shape crystals and the effect of suppressing the propagation of cracks was not observed.

Subsequently, raw materials were prepared such that 50 g of the glass (excluding C) having the composition of Example 6 shown by mass % in the column of glass composition in Table 1 was obtained, and melted at 1,550° C. for 1 hour in the air by using an alumina crucible. The glass obtained was annealed in the same manner as above to obtain a glass slab. A part of the glass was cut and heated up to 1,200° C. from room temperature at a rate of 100° C. per hour. Then, the cut piece was heat-treated by maintaining at the temperature for 2 hours, cooled to 750° C. at a rate of 100° C. per hour and then naturally cooled in the furnace to obtain a glass sample. The glass of Example 6 has a glass transition point Tg of 821° C.

Crystalline phase precipitated inside the glass was identified by XRD in the same procedures as above, and it was confirmed that anorthite ($CaAl_2Si_2O_8$) is precipitated inside the glass of Example 6. XRD pattern of crystals precipitated inside the glass of Example 6 is shown in FIG. 7.

The glass sample was mirror polished to a thickness of 2.5 mm in the procedures as above, and after indenting Vickers diamond indenter under a load of 1 kg, the circumferential state of the impression was observed with SEM. The photograph ((a) of FIG. 9) and its enlarged view ((b) of FIG. 9) are shown in FIG. 9. In the case where crystals of anorthite ($CaAl_2Si_2O_8$) were precipitated as in the glass of Example 6, cracks propagated on the crystals and the effect of suppressing the propagation of cracks was not observed.

Subsequently, raw materials were prepared such that 50 g of the glass (excluding C) having the composition of Example 7 shown by mass % in the column of glass composition in Table 1 was obtained, and melted at 1,550° C. for 1 hour in the air by using an alumina crucible. The glass obtained was annealed in the same manner as above to obtain a glass slab. A part of the glass was cut and heated to 1,050° C. from room temperature at a rate of 100° C. per hour. Then, the cut piece was heat-treated by maintaining at the temperature for 2 hours, cooled to 750° C. at a rate of 100° C. per hour and then naturally cooled in the furnace to obtain a glass sample. The glass of Example 7 has a glass transition point Tg of 821° C.

Crystalline phase precipitated inside the glass was identified by XRD and observed with SEM, and Vickers diamond indenter was indented under a load of 1 kg, in the same procedures as above. It could be confirmed from the XRD pattern that dmisteinbergite was precipitated inside the glass. It was confirmed from the SEM photograph that the amount of dmisteinbergite precipitated was 2% or more in terms of volume fraction. The propagation of cracks was not observed under a load of 1 kg.

Subsequently, raw materials were prepared such that 50 g of the glass (excluding C) having the composition of Example 8 shown by mass % in the column of glass composition in Table 1 was obtained, and melted at 1,550° C. for 1 hour in the air by using an alumina crucible. The glass obtained was annealed in the same manner as above to obtain a glass slab. A part of the glass was cut and heated up to 1,000° C. from room temperature at a rate of 100° C. per hour. Then, the cut piece was heat-treated by maintaining at the temperature for 2 hours, cooled to 750° C. at a rate of 100° C. per hour and then naturally cooled in the furnace to obtain a glass sample. The glass of Example 7 has a glass transition point Tg of 806° C.

In the same procedures as above, crystalline phase precipitated inside the glass was identified by XRD and observed with SEM, and Vickers diamond indenter was indented under a load of 1 kg, in the same procedures as above. It could be confirmed from the XRD pattern that dmisteinbergite was precipitated inside the glass. It was confirmed from the SEM photograph that the amount of dmisteinbergite precipitated was 2% or more in terms of volume fraction. The propagation of cracks was not observed under a load of 1 kg.

TABLE 1

|        | Ex. 1 | Ex. 2 | Ex. 3 | Ex. 4 | Ex. 5 | Ex. 6 | Ex. 7 | Ex. 8 |
|--------|-------|-------|-------|-------|-------|-------|-------|-------|
| $SiO_2$ | 55.0 | 55.0 | 55.0 | 55.0 | 50.0 | 55.0 | 55.0 | 45.0 |
| $Al_2O_3$ | 20.0 | 20.0 | 20.0 | 20.0 | 18.2 | 20.0 | 20.0 | 20.0 |
| MgO    |       |       |       |       | 9.1  |      |      |      |
| CaO    | 25.0  | 25.0  | 25.0  | 25.0  | 13.7 | 25.0 | 25.0 | 35.0 |
| $TiO_2$ |       |       |       |       | 9.0  |      |      |      |
| $MoO_3$ | 0.5  | 0.5   | 0.5   | 0.1   |      | 0.5  | 0.05 | 0.1  |
| C      | 0.4   | 0.2   | 0.1   | 0.4   |      | 0.4  |      | 0.4  |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Heat treatment temperature (° C.) | 1,050 | 1,050 | 1,050 | 1,050 | 1,050 | 1,200 | 1,050 | 1,000 |
| Precipitated crystal | Dm | Dm | Dm | Dm | M/T | An | Dm | Dm |

Symbols relating to precipitated crystals in the Table are as follows.

Dm: Dmisteinbergite
M/T: Magnesium-titanate
An: Anorthite

Subsequently, raw materials were prepared such that 50 g of the glass (excluding C) having the composition of Example 9 shown by mass % in the column of glass composition in Table 2 was obtained, and raw materials were prepared such that 400 g of the glass (excluding C) having the composition of Example 10 was obtained. The glass of Example 9 and the glass of Example 10 were melted by using an alumina crucible and by using a platinum crucible, respectively, at 1,550° C. for 1 hour in the air. Silica powder, aluminum oxide, calcium carbonate, tungsten oxide, and carbon powder in an amount of mass % shown in Table 2 as raw materials were weighed and mixed. The glasses obtained were annealed in the same manner as above to obtain glass slabs. A part of each glass was cut and heated up to 1,050° C. from room temperature at a rate of 100° C. per hour. Then, the cut pieces were heat-treated by maintaining at the temperature for 2 hours, cooled to 750° C. at a rate of 100° C. per hour and then naturally cooled in the furnace to obtain glass samples. The glass of Example 9 has a glass transition point Tg of 827° C. and the glass of Example 10 has a glass transition point Tg of 824° C.

With respect to each of the glasses, crystalline phase precipitated inside the glass was identified by XRD and observed with SEM, and Vickers diamond indenter was indented under a load of 1 kg, in the same procedures as above. It could be confirmed from the XRD pattern that dmisteinbergite was precipitated inside the glasses. It was confirmed from the SEM photograph that the amount of dmisteinbergite precipitated was 2% or more in terms of volume fraction. The propagation of cracks was not observed under a load of 1 kg.

TABLE 2

|  | Example 9 | Example 10 |
|---|---|---|
| $SiO_2$ | 57.0 | 56.0 |
| $Al_2O_3$ | 20.0 | 20.0 |
| CaO | 23.0 | 24.0 |
| $WO_3$ | 0.08 | 0.036 |
| C | 0.4 | 0.4 |
| Heat treatment Temperature (° C.) | 1,050 | 1,050 |
| Precipitated crystal | Dm | Dm |

The symbol relating to precipitated crystal in the Table is as follows

Dm: Dmisteinbergite

Subsequently, glasses (excluding C) having the compositions of Examples 11 to 17 shown by mass % in the column of glass composition in Table 3 were manufactured. Raw materials were prepared such that 50 g of the glass was obtained, and melted at 1,550° C. for 1 hour in the air by using a platinum crucible. Silica powder, aluminum oxide, calcium carbonate, molybdenum oxide, titanium oxide, niobium oxide, cerium oxide, and carbon powder in an amount of mass % shown in Table 3 as raw materials were weighed and mixed. The glasses obtained were annealed in the same manner as above to obtain glass slabs. In the glasses of Example 16 and Example 17, the amount of niobium oxide or cerium oxide added was determined such that atoms of niobium or cerium is equal to the number of atoms of titanium in the glass of Example 13. A part of each glass was cut and heated up to 1,050° C. from room temperature at a rate of 100° C. per hour. Then, the cut pieces were heat-treated by maintaining at the temperature for 2 hours, cooled to 750° C. at a rate of 100° C. per hour and then naturally cooled in the furnace to obtain glass samples. The glasses of Examples 11 to 17 each have a glass transition point Tg of 821° C.

The appearance of glass before the heat treatment and the presence or absence of crystal precipitation inside the glass after the heat treatment were examined, and the results of those are shown in Table 3. Regarding the glasses of Example 11 and Example 13, crystalline phase precipitated inside the glass was identified by XRD and observed with SEM, and Vickers diamond indenter was indented under a load of 1 kg. It could be confirmed from the XRD pattern that the crystal precipitated inside these glasses was dmisteinbergite. It was confirmed from the SEM photograph that the amount of dmisteinbergite precipitated was 2% or more in terms of volume fraction. The propagation of cracks was not observed under a load of 1 kg.

TABLE 3

|  | Ex. 11 | Ex. 12 | Ex. 13 | Ex. 14 | Ex. 15 | Ex. 16 | Ex. 17 |
|---|---|---|---|---|---|---|---|
| $SiO_2$ | 55.0 | 55.0 | 55.0 | 55.0 | 55.0 | 55.0 | 55.0 |
| $Al_2O_3$ | 20.0 | 20.0 | 20.0 | 20.0 | 20.0 | 20.0 | 20.0 |
| CaO | 25.0 | 25.0 | 25.0 | 25.0 | 25.0 | 25.0 | 25.0 |
| $MoO_3$ | 0.02 | 0.005 | 0.005 | 0.002 | 0.005 | 0.005 | 0.005 |
| $TiO_2$ |  |  | 0.28 | 0.28 | 0.10 |  |  |
| $Nb_2O_5$ |  |  |  |  |  | 0.47 |  |
| $CeO_2$ |  |  |  |  |  |  | 0.60 |
| C | 0.4 | 0.4 | 0.4 | 0.4 | 0.4 | 0.4 | 0.4 |
| Appearance of glass | Black | Light grey | Light purple | Light purple | Colorless | Colorless | Colorless |

TABLE 3-continued

|  | Ex. 11 | Ex. 12 | Ex. 13 | Ex. 14 | Ex. 15 | Ex. 16 | Ex. 17 |
|---|---|---|---|---|---|---|---|
| Heat treatment temperature (° C.) | 1,050 | 1,050 | 1,050 | 1,050 | 1,050 | 1,200 | 1,050 |
| Presence or absence of precipitated crystal | Presence | Almost absence | Presence | Almost absence | Almost absence | Absence | Absence |
| Precipitated crystal | Dm | — | Dm | — | — | — | — |

The symbol relating to precipitated crystal in the Table is as follows

Dm: Dmisteinbergite

It was found that although the glass of Example 13 has an amount of $MoO_3$ added as low as 0.005 mass % in terms of the content to the glass, sufficient amount of dmisteinbergite is precipitated and the propagation of cracks in the glass is suppressed. This indicates that $TiO_2$ simultaneously added is effective as an auxiliary agent of nucleation. From the comparison between Example 11 and Example 13, when the amount of $MoO_3$ added is small, the glass can be prevented from coloring black. Therefore, to apply the glass of the present invention to the uses in which black is not preferred, it is preferred that $TiO_2$ is concurrently used to decrease the amount of $MoO_3$ added. From the fact that the glass of Example 13 has light purple, it is assumed that a part of Ti ions is reduced to $Ti^{3+}$ state in the glass, and it is further assumed that this thermally reduces Mo ions in the glass when reheating the glass and accelerates the formation of metallic Mo that causes heterogeneous nucleation of dmisteinbergite. However, from Example 14, in the case where the amount of $MoO_3$ added is 0.002 mass % in terms of the content to the glass, this effect is low. Furthermore, from Example 15, in the case where the amount of $TiO_2$ added is 0.1 mass % in terms of the content to the glass, the effect is similarly low. It is assumed from the glasses of Example 16 and Example 17 that $Nb_2O_5$ and $CeO_2$ do not have particularly effective nucleation assisting effect like $TiO_2$.

Subsequently, glasses (excluding C) having the compositions of Examples 18 to 20 shown by mass % in the column of glass composition in Table 4 were manufactured. Raw materials were prepared such that 50 g of the glass was obtained, and melted at 1,550° C. for 1 hour in the air by using a platinum crucible. Silica powder, aluminum oxide, calcium carbonate, molybdenum oxide, tungsten oxide, titanium oxide, and carbon powder in an amount of mass % shown in Table 4 as raw materials were weighed and mixed. The glasses obtained were annealed in the same manner as above to obtain glass slabs. A part of each glass was cut and heated up to 1,050° C. from room temperature at a rate of 100° C. per hour. Then, the cut pieces were heat-treated by maintaining at the temperature for 2 hours, cooled to 750° C. at a rate of 100° C. per hour and then naturally cooled in the furnace to obtain glass samples. The glasses of Examples 18 to 20 each have a glass transition point Tg of 821° C.

The appearance of glass before the heat treatment and the presence or absence of crystals precipitated inside the glass after the heat treatment were examined, and the results of those are shown in Table 4. Regarding the glasses of Example 18 and Example 20, crystalline phase precipitated inside the glass was identified by XRD and observed with SEM, and Vickers diamond indenter was indented under a load of 1 kg. It could be confirmed from the XRD pattern that the crystal precipitated inside these glasses was dmisteinbergite. It was confirmed from the SEM photograph that the amount of dmisteinbergite precipitated was 2% or more in terms of volume fraction. The propagation of cracks was not observed under a load of 1 kg. It was found from the results of Example 18 that in the case where the amount of $MoO_3$ added is 0.005 mass % in terms of the content to the glass, crystal of dmisteinbergite can be precipitated even by the addition of $TiO_2$ in an amount of 0.14 mass % in terms of the content to the glass. Furthermore, it was revealed from the results of Example 20 that even in the case where $WO_3$ was added in an amount of 0.018 mass % in terms of the content to the glass, dmisteinbergite can be precipitated by the action of $TiO_2$.

TABLE 4

|  | Ex. 18 | Ex. 19 | Ex. 20 |
|---|---|---|---|
| $SiO_2$ | 55.0 | 55.0 | 55.0 |
| $Al_2O_3$ | 20.0 | 20.0 | 20.0 |
| CaO | 25.0 | 25.0 | 25.0 |
| $MoO_3$ | 0.005 | | |
| $WO_3$ | | 0.008 | 0.018 |
| $TiO_2$ | 0.14 | 0.28 | 0.28 |
| $Nb_2O_5$ | | | |
| $CeO_2$ | | | |
| C | 0.4 | 0.4 | 0.4 |
| Appearance of glass | Colorless | Light grey | Light purple |
| Heat treatment Temperature (° C.) | 1,050 | 1,050 | 1,050 |
| Presence or absence of precipitated crystal | Presence | Almost absence | Presence |
| Precipitated Crystal | Dm | — | Dm |

The symbol relating to precipitated crystal in the Table is as follows

Dm: Dmisteinbergite

In order to confirm a substance serving as a nucleating agent of dmisteinbergite, the glass after the heat treatment shown in Example 7 was observed by using a transmission electron microscope (TEM, JEM-2010) manufactured by JEOL. FIG. 10 includes a SEM image ((a) of FIG. 10) of a sample to slice for TEM observation and a TEM observation image ((b) of FIG. 10) of the cross-sectional sliced sample. White bright spot appeared at the center of dmisteinbergite precipitated (the center of a needle-shaped part as a cutting surface of a flat plate-shaped crystal) in the SEM image was observed as a particle showing dark contrast at a deep part of about 0.5 μm from the surface in the TEM observation of the slice. The components of the particle was analyzed by EDX (JED-2300T, manufactured by JEOL) attached to TEM, and the result is shown in FIG. 11. As is apparent from the chart, it is understood that the signal of Mo is strongly observed from the particle. FIG. 12 shows electron beam diffraction pattern of the particle. (a) of FIG. 12 shows the diffraction pattern actually obtained by TEM, and (b) of FIG. 12 shows the diffraction image, which appears when irradiating metal molybdenum with electron beams, generated by calculation. Metal molybdenum has a body-centered cubic structure, and the size of the unit lattice is 0.3147 nm.

The result obtained by calculating diffraction pattern appearing when entering electron beams into this lattice from [−1, 1, 1] direction is (b) of FIG. 12. The electron beam diffraction pattern actually observed ((a) of FIG. 12) is well consistent with the diffraction pattern by calculation of metal molybdenum particle, and intervals of diffraction lattice points (arrows D1, D2 and D3 in (a) of FIG. 12) are all 0.222 nm, which were completely consistent with values obtained from the size of the unit lattice of metal molybdenum. From the results of the above observation, it is considered that dmisteinbergite was precipitated by heterogeneous nucleation with metal Mo particles dispersed in the glass as starting points. Therefore, it is considered that $MoO_3$ functions as a nucleating agent.

Subsequently, glasses (excluding Si) having the compositions of Examples 21 to 24 shown by mass % in the column of glass composition in Table 5 were manufactured. Raw materials were prepared such that 50 g of the glass was obtained, and melted at 1,550° C. for 1 hour in the air by using a platinum crucible. Silica powder, aluminum oxide, calcium carbonate, molybdenum oxide, tungsten oxide, and metal Si powder in an amount of mass % shown in Table 5 as raw materials were weighed and mixed. The glasses obtained were annealed in the same manner as above to obtain glass slabs. A part of each glass was cut and heated up to 1,050° C. from room temperature at a rate of 100° C. per hour. Then, cut pieces were heat-treated by maintaining at the temperature for 2 hours, cooled to 750° C. at a rate of 100° C. per hour and then naturally cooled in the furnace to obtain glass samples. The glasses of Examples 21 to 28 each have a glass transition point Tg of 821° C.

The appearance of glass before the heat treatment and the presence or absence of crystals precipitated inside the glass after the heat treatment were examined, and the results of those are shown in Table 5. Regarding the glasses of Examples 21 and 24, crystalline phase precipitated inside the glass was identified by XRD and observed with SEM, and Vickers diamond indenter was indented under a load of 1 kg. From the XRD patterns, it could be confirmed that the crystal precipitated inside these glasses was dmisteinbergite, and regarding the glass of Example 24, it was found that anorthite and wollastonite were precipitated. It was confirmed from the SEM photograph that the amount of dmisteinbergite precipitated was 2% or more in terms of volume fraction. Regarding the glasses of Example 21, Example 22 and Example 23, SEM photographs of the glasses having crystals precipitated therein are shown in FIG. 13, FIG. 14 and FIG. 15, respectively. From the results of Example 21 and Example 22, it is considered that metal Si showed the function as a reducing agent, similar to carbon, and dmisteinbergite was precipitated. Furthermore, even in the glass of Example 23 in which $MoO_3$ and $WO_3$ were not added and only metal Si was added, dmisteinbergite was precipitated. From this fact, it was revealed that nucleation function is exhibited even by the addition of only metal Si. However, it was understood from Example 24 that the addition of only excessive metal Si causes no precipitation of dmisteinbergite and colors the glass black.

TABLE 5

|  | Ex. 21 | Ex. 22 | Ex. 23 | Ex. 24 |
| --- | --- | --- | --- | --- |
| $SiO_2$ | 55 | 55 | 55 | 55 |
| $Al_2O_3$ | 20 | 20 | 20 | 20 |
| CaO | 25 | 25 | 25 | 25 |
| $MoO_3$ | 0.05 | | | |

TABLE 5-continued

|  | Ex. 21 | Ex. 22 | Ex. 23 | Ex. 24 |
| --- | --- | --- | --- | --- |
| $WO_3$ | | 0.08 | | |
| Si | 0.01 | 0.01 | 0.01 | 0.24 |
| Appearance of glass | Light grey | Light grey | Colorless | Black |
| Heat treatment Temperature (° C.) | 1,050 | 1,050 | 1,050 | 1,050 |
| Presence or absence of precipitated crystal | Presence | Presence | Presence | Presence |
| Precipitated crystal | Dm | Dm | Dm | An, Wo |

The symbols relating to precipitated crystal in the Table are follows

Dm: Dmisteinbergite

An: Anorthite

Wo: Wollastonite

Although the present invention has been described in detail and by reference to the specific embodiments, it is apparent to one skilled in the art that various modifications or changes can be made without departing the spirit and scope of the present invention.

This application is based on Japanese Patent Application (No. 2016-034459) filed on Feb. 25, 2016, Japanese Patent Application (No. 2016-141309) filed on Jul. 19, 2016 and Japanese Patent Application (No. 2016-235168) filed on Dec. 2, 2016, the disclosures of which are incorporated herein by reference in their entities.

The invention claimed is:

1. A glass:

comprising, in terms of mass % on oxide basis, $SiO_2$ 40 to 80%, $Al_2O_3$ 1 to 30% and CaO 1 to 40%, and comprising a dmisteinbergite as a crystalline phase.

2. The glass according to claim 1, wherein the dmisteinbergite has peaks at 2θ in at least the vicinity of 20°, the vicinity of from 23 to 25° and the vicinity of 35° in a diffraction X-ray analysis using Cu-Kα beam as a radiation source.

3. The glass according to claim 1, comprising the dmisteinbergite in an amount of 2% or more in terms of volume fraction (SEM observation).

4. The glass according to claim 1, further comprising at least one of $MoO_3$, $Fe_2O_3$, $WO_3$, $V_2O_5$, $Cr_2O_3$, $Ta_2O_5$, and $TiO_2$.

5. The glass according to claim 4, comprising $MoO_3$ in an amount of from 0.01 to 1% in terms of mass % on oxide basis.

6. The glass according to claim 4, comprising $WO_3$ in an amount of from 0.01 to 1% in terms of mass % on oxide basis.

7. The glass according to claim 4, comprising $TiO_2$ in an amount of from 0.11 to 0.5% in terms of mass % on oxide basis, and comprising $MoO_3$ in an amount of from 0.003 to 1% in terms of mass % on oxide basis.

8. The glass according to claim 4, comprising $TiO_2$ in an amount of from 0.1 to 0.5% in terms of mass % on oxide basis, and comprising $WO_3$ in an amount of from 0.01 to 1% in terms of mass % on oxide basis.

9. A method for manufacturing the glass described in claim 1, comprising:
 melting glass raw materials prepared so as to have the following composition in terms of mass % on oxide basis and to further contain from 0.2 to 5 mass % of C added thereto,
 annealing and then,
 heat-treating at a temperature of Tg+50° C. or higher and Tg+600° C. or lower (but lower than a liquidus temperature of a glass to be manufactured) wherein Tg (° C.) represents a glass transition point of the glass to be manufactured:
 $SiO_2$ 40 to 80%,
 $Al_2O_3$ 1 to 30%, and
 CaO 1 to 40%.

10. A method for manufacturing the glass described in claim 1, comprising:
 melting glass raw materials prepared so as to have the following composition in terms of mass % on oxide basis and to further contain from 0.001 to 5 mass % of Si added thereto,
 annealing and then,
 heat-treating at a temperature of Tg+50° C. or higher and Tg+600° C. or lower (but lower than a liquidus temperature of a glass to be manufactured) wherein Tg (° C.) represents a glass transition point of the glass to be manufactured:
 $SiO_2$ 40 to 80%,
 $Al_2O_3$ 1 to 30%, and
 CaO 1 to 40%.

11. The method for manufacturing the glass, according to claim 10,
 wherein the glass raw materials containing from 0.001 to 0.2 mass % of Si added thereto is melted.

12. The glass according to claim 1, obtained by:
 melting glass raw materials prepared so as to have the following composition in terms of mass % on oxide basis and to further contain from 0.001 to 0.2 mass % of Si added thereto,
 annealing and then,
 heat-treating at a temperature of Tg+50° C. or higher and Tg+600° C. or lower (but lower than a liquidus temperature of a glass to be manufactured) wherein Tg (° C.) represents a glass transition point of the glass to be manufactured:
 $SiO_2$ 40 to 80%,
 $Al_2O_3$ 1 to 30%, and
 CaO 1 to 40%.

* * * * *